United States Patent [19]

Park et al.

[11] Patent Number: 5,691,263
[45] Date of Patent: Nov. 25, 1997

[54] AMORPHOUS PEROVSKITE CATALYSTS FOR NITROGEN OXIDE REDUCTION AND METHODS OF PREPARING THE SAME

[75] Inventors: Sang Un Park; Sang Ho Lee; Kyung Mi Kim; Jong San Jang, all of Taejun; Jong Hae Lee, Seoul, all of Rep. of Korea

[73] Assignee: Korea Research Institute of Chemical Technology, Taejun, Rep. of Korea

[21] Appl. No.: 702,249

[22] Filed: Aug. 28, 1996

[30] Foreign Application Priority Data

Sep. 5, 1995 [KR] Rep. of Korea ............... 95-28862

[51] Int. Cl.$^6$ ............................................... B01J 29/068
[52] U.S. Cl. ........................... 502/66; 502/525; 502/302; 502/306; 502/344; 502/325; 502/326; 502/64
[58] Field of Search ........................... 502/525, 302, 502/306, 344, 325, 326, 66, 64

[56] References Cited

U.S. PATENT DOCUMENTS

| | | | |
|---|---|---|---|
| 3,330,697 | 7/1967 | Pechini | 427/79 |
| 4,748,143 | 5/1988 | Tabata et al. | 502/304 |
| 4,849,398 | 7/1989 | Takada et al. | 502/303 |
| 5,182,249 | 1/1993 | Wang et al. | 502/303 |
| 5,318,937 | 6/1994 | Jovanovic et al. | 502/303 |
| 5,336,651 | 8/1994 | Yoshimoto et al. | 502/74 |

Primary Examiner—Glenn A. Caldarola
Assistant Examiner—Nadine Preisch
Attorney, Agent, or Firm—Thomas R. Vigil

[57] ABSTRACT

The amorphous perovskite structure catalysts according to the present invention comprise a carrier material and a mixture of at least two metal oxides supported thereon, which have the following formula:

$$(M^1{}_aO_x M^2{}_{1-a}O_y)(M^3{}_bO_z M^4{}_{1-b}O_w)/S$$

wherein $M^1$ and $M^2$ independently of each other are selected from the group consisting of the lanthanide metals, the alkali metals and the alkaline earth metals, $M^3$ and $M^4$ independently of each other are selected from the group consisting of the transition metals and the platinum metals, a and b are from 0 to 1, x, y, z and w are determined stoichiometrically on the values of a and b, the ratio of $[M^1+M^2]$ to $[M^3+M^4]$ is 0.1~3.0:1.0, and S is a carrier material. The process for preparing the amorphous perovskite structure catalysts comprises dissolving completely at least two salt solutions of metals, $M^1$, $M^2$, $M^3$ and $M^4$, and an acid in an organic acid, preparing an ester type resin intermediate by adding a hydroxy alcohol to the solution, mixing the solution in a liquid state by adding a powder type carrier material, distilling the mixed solution under a reduced pressure so as to concentrate the solution into a high viscous state, drying the concentrated solution using a microwave into a gel type catalyst precursor, and calcining the precursor stepwise at the temperatures of 300°~700° C. The process can provide amorphous perovskite structure catalysts having a high specific surface area and a good dispersion for denitrizing nitrogen oxides.

16 Claims, No Drawings

AMORPHOUS PEROVSKITE CATALYSTS FOR NITROGEN OXIDE REDUCTION AND METHODS OF PREPARING THE SAME

FIELD OF THE INVENTION

The present invention relates to perovskite catalysts comprising perovskite materials supported in a carrier for denitrization of nitrogen oxides, which are useful in treating automotive exhaust gases and industrial waste gases. More particularly, the present invention relates to amorphous perovskite catalysts having a high specific surface area for reduction of nitrogen oxides, comprising a carrier material and at least two metal oxides supported in the carrier material.

BACKGROUND OF THE INVENTION

There are many concerns for study about perovskite materials containing at least two metal oxides due to various applications to particular uses of the materials and catalysts. The perovskite materials have different surface characteristics each other, for example, electric conductivity, magnetic property or oxygen deficiency depends on the kinds and compositions of metal components, preparation methods, calcining processes, etc. Considering these physical properties of perovskite materials, the materials are used as electric and magnetic materials such as superconductors, piezoelectric elements and magnetic bodies, and as catalysts materials for treating exhaust gases in a carbon monoxide oxidation, an unsaturated hydrocarbon oxidation or a nitrogen oxide reduction.

For preparing a perovskite structure catalyst having a high specific surface area and a good dispersion, metal components should evenly be admixed and drying and calcining processes should be carried out in a good state.

Various conventional methods are known for preparing perovskite structure materials and catalysts. One of the methods is disclosed in U.S. Pat. No. 3,330,697 to Pechini et al. In the instant patent, there is disclosed a process of preparing mixtures of at least two members of the group consisting of the titanates, zirconates and niobates of lead and the alkaline earth metals comprising (a) forming individual solutions of titanium, zirconium and niobium with 2~8 moles of citric acid dissolved in a polyhydroxy alcohol, (b) dissolving in a portion of each of said individual solutions from ½ to 1½ the stoichiometric equivalent of a basic metal compound from the group consisting of the oxide, hydroxide, carbonate and alkoxide of lead and the alkaline earth metals, (c) mixing at least two of the solutions of step (b), (d) evaporating the excess alcohol to leave a resin intermediate and (e) calcining said resin to remove the organic portion thereof. However, as the mixtures are not supported on a carrier, they are not suitable for use as catalysts. For use of a perovskite material as a catalyst, the material should be supported on a carrier, and have a high specific surface area and a good dispersion.

U.S. Pat. No. 5,318,937 to Jovanovic et al. teaches a catalyst for a carbon monoxide oxidation, an unsaturated hydrocarbon oxidation, or a nitrogen oxide reduction, comprising a perovskite material having a single phase supported on a carrier. The perovskite material has a composition of the formula $La_{1-x}Sr_xCr_{1-y}Ru_yO_3$ wherein $0.1 \leq x \leq 0.5$ and $0.01 \leq y \leq 0.075$. The material is resistant to sulfur oxide poisoning and resistant to decomposition at high temperatures.

Further, U.S. Pat. No. 5,336,651 discloses a catalyst for denitrizing nitrogen oxides in the presence of a hydrocarbon as a reducing agent, which comprises (A) a substituted zeolite having the general formula $M^1_A M^2_B[(AlO_2)_x(SiO_2)_y] \cdot Z\ H_2O$ and (B) at least one metal or an oxide of a metal selected from the group consisting of Pd and Pt supported on the substituted zeolite in an amount of 0.1~10% by weight based on the zeolite.

The carrier supported perovskite structure catalysts of U.S. Pat. Nos. 5,318,937 and 5,336,651 have a high crystallization, but not a high specific surface area, because the catalysts are calcined at relatively high temperatures. Therefore, the catalysts cannot provide good activities as catalysts.

Accordingly, the present inventors have developed perovskite structure catalysts for denitrizing nitrogen oxides, having a high specific surface area and a good dispersion so as to give an excellent activity as catalyst, and processes of preparing the catalysts, thereby overcoming the shortcomings of the prior conventional perovskite catalysts.

OBJECTS OF THE INVENTION

Therefore, it is an object of the present invention to provide an amorphous perovskite structure catalyst for denitrizing nitrogen oxides, comprising a carrier material and at least two metal oxides supported thereon.

It is another object of the present invention to provide an amorphous perovskite structure catalyst having a high specific surface area for denitrizing nitrogen oxides, comprising a carrier material and at least two metal oxides supported thereon.

It is still another object of the present invention to provide an amorphous perovskite structure catalyst having a good dispersion for denitrizing nitrogen oxides, comprising a carrier material and at least two metal oxides supported thereon.

It is still another object of the present invention to provide an amorphous perovskite structure catalyst having a high specific surface area and a good dispersion, thereby providing a good activity as catalyst for denitrizing nitrogen oxides, comprising a carrier material and at least two metal oxides supported thereon.

It is still another object of the present invention to provide a method of preparing an amorphous perovskite structure catalyst having a high specific surface area and a good dispersion, thereby providing a good activity as catalyst for denitrizing nitrogen oxides, comprising a carrier material and at least two metal oxides supported thereon.

These and additional objects can be achieved by the catalysts and methods according to the present invention.

SUMMARY OF THE INVENTION

The amorphous perovskite structure catalysts according to the present invention comprise a carrier material and a mixture of at least two metal oxides supported thereon, which have the following formula:

$$(M^1_aO_x\text{-}M^2_{1-a}O_y)(M^3_bO_z\text{-}M^4_{1-b}O_w)/Sup$$

wherein $M^1$ and $M^2$ independently of each other are selected from the group consisting of the lanthanide metals such as lanthanum, cerium, praseodymium and neodymium, the alkali metals such as sodium, potassium and cesium, and the alkaline earth metals such as strontium and barium, $M^3$ and $M^4$ independently of each other are selected from the group consisting of the transition metals such as iron, cobalt, copper, nickel, chromium, vanadium, titanium, manganese, zinc, silver and rhenium and the platinum metals such as ruthenium, rhodium, palladium, osmium, iridium and platinum, a and b are from 0 to 1, x, y, z and w are determined stoichiometrically on the values of a and b, the ratio of $[M^1+M^2]$ to $[M^3+M^4]$ is 0.1~3.0:1.0, and Sup (the support material) is an aluminum- or silicon-containing carrier material such as zeolite, silica, alumina, and silica-alumina.

In accordance with the invention, the process for preparing the amorphous perovskite structure catalysts comprises dissolving completely at least two salt solutions of metals, $M^1$, $M^2$, $M^3$ and $M^4$, and an acid such as nitric acid, acetic acid and hydrochloric acid in an organic acid such as citric acid, lactic acid and glycolic acid, preparing an ester type resin intermediate by adding a hydroxy alcohol such as ethylene glycol to the solution, mixing the solution in a liquid state by adding a powder type carrier material, distilling the mixed solution under a reduced pressure so as to concentrate the solution into a high viscous state, drying the concentrated solution using a microwave into a gel type catalyst precursor, and calcining the precursor stepwise at the temperatures of 300°~700° C. The process can provide amorphous perovskite structure catalysts having a high specific surface area and a good dispersion for denitrizing nitrogen oxides.

DETAILED DESCRIPTION OF THE INVENTION

In accordance with the present invention, the amorphous perovskite structure catalysts for denitrizing nitrogen oxides comprise a carrier material and a mixture of at least two metal oxides supported thereon. The metal oxides are evenly dispersed and supported on a carrier, and the catalysts have a high surface area. The catalysts can provide excellent activities for denitrizing nitrogen oxides due to the good dispersion of the metal oxides and the high specific area of the catalysts.

According to the invention, the perovskite type catalysts are amorphous. That is, amorphous metal oxides are supported on a carrier material. It is believed that metal components are completely dissolved in the same stoichiometric equivalent of an organic acid, and that the mixed solution is distilled under a reduced pressure so as to concentrate the solution into a high viscous state, and dried using a microwave into a gel type catalyst precursor.

The amorphous perovskite structure catalysts comprise a carrier material and a mixture of at least two metal oxides supported thereon, which have the following formula:

$$(M^1_aO_x \cdot M^2_{1-a}O_y)(M^3_bO_z \cdot M^4_{1-b}O_w)/\text{Sup}$$

wherein $M^1$ and $M^2$ independently of each other are selected from the group consisting of the lanthanide metals such as lanthanum, cerium, praseodymium and neodymium, the alkali metals such as sodium, potassium and cesium, and the alkaline earth metals such as strontium and barium, $M^3$ and $M^4$ independently of each other are selected from the group consisting of the transition metals such as iron, cobalt, copper, nickel, chromium, vanadium, titanium, manganese, zinc, silver and rhenium and the platinum metals such as ruthenium, rhodium, palladium, osmium, iridium and platinum, a and b are from 0 to 1, x, y, z and w are determined stoichiometrically on the values of a and b, the ratio of $[M^1+M^2]$ to $[M^3+M^4]$ is 0.1~3.0:1.0, and Sup is an aluminum- or silicon-containing carrier material such as zeolite, silica, alumina, and silica-alumina.

In the general formula above, the mole ratio of the mixture of at least two metal oxides representing as $(M^1_aO_x \cdot M^2_{1-a}O_y)(M^3_bO_z \cdot M^4_{1-b}O_w)$ to the carrier material representing as S is from 0.01:1.0 to 100:1, preferably from 0.01:1.0 to 5:1.

In accordance with the invention, the new processes for preparing the amorphous perovskite structure catalysts will be described in detail hereinafter.

At least two salt solutions of metals, $M^1$, $M^2$, $M^3$ and $M^4$, and an acid solution are completely dissolved in the same stoichiometric equivalent of an organic acid. As illustrative examples of the acid solution, there are a nitric acid, an acetic acid and a hydrochloric acid. It is preferable that the organic acid has at least one functional group, because the functional group can form metal complex compounds. Illustrative examples of the organic acid are a citric acid, a lactic acid and a glycolic acid.

After completely dissolving the salt solutions of metals, $M^1$, $M^2$, $M^3$ and $M^4$, and an acid solution in the same stoichiometric equivalent of an organic acid, an ester type resin intermediate is prepared by adding a hydroxy alcohol such as ethylene glycol to the solution. The viscosity of the resulting solution increases due to polymerization of the resin intermediate.

To the resulting metal complex solution is added a carrier material in a powder state. The carrier material is an aluminum- and/or silicon-containing carrier material. At least one carrier material of zeolite, silica, alumina, and silica-alumina may be used in this invention.

Then, the solution is mixed with a conventional mixing means at a room temperature.

The mixed solution is distilled under a reduced pressure, thereby concentrating the solution into a high viscous state. The distilling process can preferably be carried out at the reduced pressure below 1.0 atmosphere, preferably at the reduced pressure of 0.1~0.5 atmosphere.

The mixed solution is dried using a microwave, thereby forming a gel type catalyst precursor. The drying process can preferably be carried out at the temperatures of 70°~150° C. In the drying process, a conventional microwave oven may be preferably used.

When completing the drying process, a light-weight, cotton-like catalyst precursor is obtained. That is, a gel type catalyst precursor is formed through the drying step.

Finally, the gel type catalyst precursor is calcined stepwise at the temperatures of 300°~700° C., thereby preparing the amorphous perovskite structure catalysts having a high specific surface area and a good dispersion for denitrizing nitrogen oxides in accordance with the present invention. This calcining process is carried out stepwise at different temperatures. A first calcining step can be performed at a low temperature, and a second calcining step at a higher temperature. At least two steps of calcining at different temperatures can be applied. For example, a first calcining step is performed at 300° C. for 5 hours, a second step at 500° C. for 5 hours, and a third step at 550° C. for 5 hours. The calcining time is apparent to those skilled in the art.

The amorphous perovskite structure catalysts prepared in accordance with the present invention have as much as 10~15 times of the specific surface area as compared with the conventional mixtures of metal oxides. Accordingly, the activities of the catalysts increase as much.

The amorphous perovskite structure catalysts have effects of the invention denitrizing effectively nitrogen oxides in treating automotive exhaust gases and industrial waste gases.

The invention may be better understood by reference to the following examples which are intended for purposes of illustration and are not to be construed as in any way limiting the scope of the present invention, which is defined in the claims appended hereto.

EXAMPLES

Example 1

This example relates to a perovskite structure catalyst that a mixture of cobalt oxides and lanthanum oxides is supported on a carrier material. 10 mmoles of a lanthanum nitrate was dissolved in 30 ml of distilled water. The same moles of a cobalt nitrate as the lanthanum nitrate was dissolved in 30 ml of distilled water. Then, the above two solutions were mixed. To the mixed solution was added a citric acid of the same moles as the lanthanum nitrate. To the solution was added an ethylene glycol of the same moles. A carrier material comprising silica and alumina (silica:alumina=40:1) was added in the amount of 25 wt. % based on the total weight of the carrier material and metal oxides. The mixed solution was distilled under a reduced pressure of 0.5 atmosphere and concentrated into a high viscous state. The viscous solution was dried in a microwave oven for one minute and a catalyst precursor was prepared in a fine powder state. To the precursor, three steps of calcining at different temperatures was applied. The first calcining step was performed at 300° C. for 5 hours, the second step at 500° C. for 5 hours, and the third step at 550° C. for 5 hours.

The catalyst prepared in this example represents as "Catalyst 1". The specific surface of Catalyst 1 was 263 m$^2$/g. As a result of X-ray diffraction analysis of the catalyst, amorphous phase of the metal oxides was observed, but crystalline phase of the metal oxides was not observed, even if the catalyst contained 25% by weight of the mixed metal oxides.

Catalyst 1 was applied to a nitrogen monoxide reduction using a hydrocarbon as a reducing agent. The catalyst was filled in a fixed layer crystal reactor with an inner diameter of 10 mm and pretreated under helium flow at 500° C. for 1 hour. The reaction temperature was 240° C. and the volume flow rate was 10,000. The compositions of the reacting gases were 1000 ppm of nitrogen monoxide, 1000 ppm of propylene and 3% by volume of oxygen. Helium gas was used as a transporting gas. The nitrogen gas produced during the reduction process was measured with a gas chromatography, and the nitrogen oxides reduced during the reduction process were measured with a nitrogen oxide analyzer. As shown in Table 1, the conversion rate of nitrogen oxide into nitrogen was 86.8% at the low reaction temperature of 240° C.

Comparative Example 1

The mixed solution of a lanthanum nitrate a cobalt nitrate was supported on the carrier material adding 0.2M sodium oxalate, the mixed solution was filtered using distilled water and dried in a dry oven at 120° C., and otherwise in the same manner as in the Example 1. A catalyst (Catalyst 2) was produced in this example. The conversion rate of nitrogen oxide into nitrogen was 16.8% at the reaction temperature of 600° C.

Comparative Example 2

The mixed solution of a lanthanum nitrate a cobalt nitrate was added to the carrier material, titrating the solution with a potassium hydroxide solution in the range of pH 7~8 so as not to produce a bicarbonate and precipitating the metal oxides on the carrier adding 0.5M sodium carbonate solution in the range of pH 9, the mixed solution was filtered using distilled water and dried in a dry oven at 120° C., and otherwise in the same manner as in the Example 1. A catalyst (Catalyst 3) was produced in this example. The conversion rate of nitrogen oxide into nitrogen was 16.2% at the reaction temperature of 460° C.

Comparative Example 3

A catalyst (Catalyst 4) was produced in the same manner as in Example 1 except that the first calcining step was performed at 900° C. for 10 hours. The conversion rate of nitrogen oxide into nitrogen was 38.7% at the reaction temperature of 560° C.

Comparative Example 4

A catalyst (Catalyst 5) was produced in the same manner as in Example 1 except that the first calcining step was performed at 800° C. for 10 hours. The conversion rate of nitrogen oxide into nitrogen was 41.2% at the reaction temperature of 500° C.

Comparative Example 5

A mixed metal oxide catalyst (Catalyst 6) was produced in the same manner as in Example 1 without using a carrier material. The specific surface of this catalyst was 27 m$^2$/g. The conversion rate of nitrogen oxide into nitrogen was 29.5% at the reaction temperature of 410° C.

Comparative Example 6

A mixed metal oxide catalyst (Catalyst 7) was produced in the same manner as in Comparative Example 4 without using a carrier material. The conversion rate of nitrogen oxide into nitrogen was 23.1% at the reaction temperature of 620° C.

Example 2

A catalyst (Catalyst 8) was produced in the same manner as in Example 1 except that 15% of the lanthanum was substituted with cerium. The conversion rate of nitrogen oxide into nitrogen was 87.1% at the reaction temperature of 320° C.

Example 3

A catalyst (Catalyst 9) was produced in the same manner as in Example 1 except that the cobalt nitrate was substituted with a copper nitrate. The conversion rate of nitrogen oxide into nitrogen was 92.6% at the reaction temperature of 440° C.

Example 4

A catalyst (Catalyst 10) was produced in the same manner as in Example 1 except that the cobalt nitrate was substituted with a nickel nitrate. The conversion rate of nitrogen oxide into nitrogen was 78.0% at the reaction temperature of 340° C.

TABLE 1

| Examples | Catalysts | Maximum Reaction Temperatures (°C.) | Conversion rates of NO into N$_2$ (%) |
| --- | --- | --- | --- |
| Example 1 | Catalyst 1 | 240 | 86.8 |
| Comparative | Catalyst 2 | 600 | 16.8 |

TABLE 1-continued

| Examples | Catalysts | Maximum Reaction Temperatures (°C.) | Conversion rates of NO into $N_2$ (%) |
|---|---|---|---|
| Example 1 Comparative Example 2 | Catalyst 3 | 460 | 16.2 |
| Comparative Example 3 | Catalyst 4 | 560 | 38.7 |
| Comparative Example 4 | Catalyst 5 | 500 | 41.2 |
| Comparative Example 5 | Catalyst 6 | 410 | 29.5 |
| Comparative Example 6 | Catalyst 7 | 620 | 23.1 |
| Example 2 | Catalyst 8 | 320 | 87.1 |
| Example 3 | Catalyst 9 | 440 | 92.6 |
| Example 4 | Catalyst 10 | 340 | 78.0 |

As shown in Table 1, the catalysts prepared in accordance with the present invention have excellent activities for reduction of nitrogen oxides.

It should be apparent to those skilled in the art that various changes and modifications can be added to the present invention without departing from the scope of the present invention which is limited only by the appended claims.

What is claimed is:

1. A process of preparing an amorphous perovskite structure catalyst that is represented by the following formula:

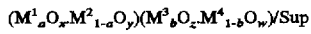

$(M^1_a O_x M^2_{1-a} O_y)(M^3_b O_z M^4_{1-b} O_w)/Sup$ wherein $M^1$ and $M^2$, independently of each other, are selected from the group consisting of the lanthanide metals, the alkali metals, and the alkaline earth metals, $M_3$ and $M_4$, independently of each other, are selected from the group consisting of the transition metals and the platinum metals, a and b are from 0 to 1, x, y, z and w are determined stoichiometrically on the values of a and b, the ratio of $[M^1+M^2]$ to $[M^3+M^4]$ is 0.1~3.0:1.0, and Sup is a carrier material, said process comprising the steps of:
dissolving completely at least two metal salt solutions of metals, $M^1$, $M^2$, $M^3$ and $M^4$, and an acid in an organic acid;
preparing a resin intermediate having an ester group by adding a hydroxy alcohol to the solution;
mixing the solution while adding a carrier material;
distilling the mixed solution at a pressure below 1.0 atmosphere so as to concentrate the solution;
drying the concentrated solution using a microwave into a gel catalyst precursor; and
calcining the precursor stepwise at a temperature of 300°~700° C.

2. The process as claimed in claim 1, wherein said mixed solution is distilled at the range of 0.1~0.5 atmosphere.

3. The process as claimed in claim 1, wherein said precursor is calcined stepwise at at least two different temperatures.

4. The process as claimed in claim 3, wherein a first calcining step is performed at a low temperature of 300°~700° C. and a second calcining step is performed at a higher temperature.

5. The process as claimed in claim 1, wherein said organic acid is selected from the group consisting of citric acid, lactic acid and glycolic acid.

6. The process as claimed in claim 1, wherein said hydroxy alcohol is an ethylene glycol.

7. The process as claimed in claim 1, wherein said carrier material is in a state of powder.

8. The process as claimed in claim 7, wherein said carrier material is selected from the group consisting of zeolite, silica, alumina and silica-alumina.

9. A perovskite catalyst prepared by the process of claim 1.

10. A perovskite catalyst prepared by the process of claim 2.

11. A perovskite catalyst prepared by the process of claim 3.

12. A perovskite catalyst prepared by the process of claim 4.

13. A perovskite catalyst prepared by the process of claim 5.

14. A perovskite catalyst prepared by the process of claim 6.

15. A perovskite catalyst prepared by the process of claim 7.

16. A perovskite catalyst prepared by the process of claim 8.

* * * * *